United States Patent
Wu et al.

(10) Patent No.: US 12,387,003 B2
(45) Date of Patent: Aug. 12, 2025

(54) DATA ANONYMIZATION FOR CLOUD ANALYTICS

(71) Applicant: BUSINESS OBJECTS SOFTWARE LTD., Dublin (IE)

(72) Inventors: Ying Wu, Dublin (IE); Malte Christian Kaufmann, Dublin (IE)

(73) Assignee: BUSINESS OBJECTS SOFTWARE LTD., Dublin (IE)

( * ) Notice: Subject to any disclaimer, the term of this patent is extended or adjusted under 35 U.S.C. 154(b) by 893 days.

(21) Appl. No.: 17/330,997

(22) Filed: May 26, 2021

(65) Prior Publication Data
US 2022/0382906 A1    Dec. 1, 2022

(51) Int. Cl.
*G06N 20/00* (2019.01)
*G06F 21/62* (2013.01)
*G06N 5/04* (2023.01)

(52) U.S. Cl.
CPC .......... *G06F 21/6254* (2013.01); *G06N 5/04* (2013.01); *G06N 20/00* (2019.01)

(58) Field of Classification Search
CPC ...... G06F 21/6254; G06F 21/00; G06F 21/60; G06F 21/6245; G06F 21/62; G06F 16/00; G06N 5/04; G06N 20/00
See application file for complete search history.

(56) References Cited

U.S. PATENT DOCUMENTS

| | | | |
|---|---|---|---|
| 10,692,019 B2* | 6/2020 | Goodsitt | G06F 18/24 |
| 2018/0165475 A1* | 6/2018 | Veeramachaneni | G06F 21/6254 |
| 2020/0065521 A1* | 2/2020 | Durvasula | H04L 63/0421 |
| 2020/0218638 A1* | 7/2020 | Watson | G06F 18/217 |
| 2020/0349467 A1* | 11/2020 | Teague | G06F 16/278 |
| 2020/0401916 A1* | 12/2020 | Rolfe | G06N 7/01 |
| 2021/0397972 A1* | 12/2021 | Walters | G06N 3/044 |
| 2022/0121540 A1* | 4/2022 | Sobolev | G06N 3/047 |
| 2022/0374682 A1* | 11/2022 | Nica | G06N 3/045 |

* cited by examiner

*Primary Examiner* — Alexander Lagor
*Assistant Examiner* — Rupali Dhakad
(74) *Attorney, Agent, or Firm* — Buckley, Maschoff & Talwalkar LLC

(57) ABSTRACT

A system and method including receiving numeric data of a first dataset including a plurality of columns having numeric values with one of the plurality of columns specified as a target column; generating a trained generative model based on numeric values in non-target columns of the plurality of columns; generating a trained predictive model based on numeric values in non-target columns of the plurality of columns being input variables and the target column being a target variable; generating, by the trained generative model, a new set of numeric data for the non-target columns; generating predicted target values for the non-target columns by the trained predictive model using the new set of numeric data as an input to the predictive model; and generating anonymized numeric data for the first dataset by combining the new set of numeric data and the target column populated with the generated predicted target values.

20 Claims, 10 Drawing Sheets

500

| | 505 | 510 | 515 | 520 | 525 | 530 | 535 | 540 |
|---|---|---|---|---|---|---|---|---|
| 545 | | NN | NN | NN | NN | N | N | N | N |
| 550 | 1 | Name | Country | Address | Phone # | Total_$$ | $$_A | $$_B | $$_C |
| 555 | 2 | | | | | | | | |
| 560 | 3 | | | | | | | | |
| | 4 | | | | | | | | |

```
┌─────────────────────────────────────────────────────────────┐
│  RECEIVE NUMERIC DATA OF A FIRST DATASET, THE NUMERIC      │
│  DATA BEING A PLURALITY OF COLUMNS OF THE FIRST DATASET    │
│  HAVING NUMERIC VALUES WITH ONE OF THE PLURALITY OF COLUMNS│
│  BEING SPECIFIED AS A TARGET COLUMN                        │
│                                                        905  │
└─────────────────────────────────────────────────────────────┘
                              │
                              ▼
┌─────────────────────────────────────────────────────────────┐
│  TRAIN A GENERATIVE MODEL BASED ON NUMERIC VALUES IN        │
│  NON-TARGET COLUMNS OF THE PLURALITY OF COLUMNS TO          │
│  GENERATE A TRAINED GENERATIVE MODEL                        │
│                                                        910  │
└─────────────────────────────────────────────────────────────┘
                              │
                              ▼
┌─────────────────────────────────────────────────────────────┐
│  TRAIN A PREDICTIVE MODEL BASED ON THE NUMERIC VALUES IN    │
│  NON-TARGET COLUMNS OF THE PLURALITY OF COLUMNS BEING       │
│  INPUT VARIABLES AND THE TARGET COLUMN BEING A TARGET       │
│  VARIABLE TO GENERATE A TRAINED PREDICTIVE MODEL            │
│                                                        915  │
└─────────────────────────────────────────────────────────────┘
                              │
                              ▼
┌─────────────────────────────────────────────────────────────┐
│  GENERATE, BY THE TRAINED GENERATIVE MODEL, A NEW           │
│  SET OF NUMERIC DATA FOR THE NON-TARGET COLUMNS             │
│                                                        920  │
└─────────────────────────────────────────────────────────────┘
                              │
                              ▼
┌─────────────────────────────────────────────────────────────┐
│  GENERATE, BY THE TRAINED PREDICTIVE MODEL USING            │
│  THE NEW SET OF NUMERIC DATA FOR THE NON-TARGET COLUMNS AS  │
│  AN INPUT TO THE TRAINED PREDICTIVE MODEL, PREDICTED TARGET │
│  VALUES CORRESPONDING TO THE INPUT OF THE NEW SET OF        │
│  NUMERIC DATA FOR THE NON-TARGET COLUMNS                    │
│                                                        925  │
└─────────────────────────────────────────────────────────────┘
                              │
                              ▼
┌─────────────────────────────────────────────────────────────┐
│  GENERATE ANONYMIZED NUMERIC DATA FOR THE FIRST             │
│  DATASET BY COMBINING THE NEW SET OF NUMERIC DATA FOR       │
│  THE NON-TARGET COLUMNS AND THE TARGET COLUMN               │
│  POPULATED WITH THE GENERATED PREDICTED TARGET VALUES       │
│                                                        930  │
└─────────────────────────────────────────────────────────────┘
```

DATA ANONYMIZATION FOR CLOUD ANALYTICS

BACKGROUND

Data anonymization is the process of protecting private or sensitive information by erasing, encrypting, or otherwise obscuring personally identifiable information stored in the data. Data might be anonymized as required by one or more of rules, laws, and regulations (e.g., General Data Protection Regulation, GDPR) and/or as desired to protect private or sensitive information of an entity (e.g., a business organization, an individual person, customers, etc.). Data anonymization processes may be used to, for example, anonymize customer data so that it can be used in public (e.g., a cloud environment) while being impossible, or nearly impossible, to de-anonymize the data to reveal the identity of the entity the data relates or belongs to.

A number of different data anonymization techniques and processes have been proposed. Some such techniques include, but are not limited to, data masking techniques to modify categorical data values using character shuffling, encryption, and word or character substitution; data shuffling techniques that rearrange dataset attributes so that the shuffled data does not correspond with their original keys; data perturbation techniques for numeric values that modifies original dataset values by applying random noise; and synthetic data generation techniques that algorithmically manufacture information instead of altering or using the original data and risking the privacy and security thereof.

Many of the formerly proposed data anonymization techniques have limitations. For example, privacy information can be hacked from shuffled data anonymized using shuffling techniques; and a small base in data perturbation techniques can lead to weak anonymization while a large base can reduce the utility of the dataset, making it difficult to obtain a generic approach that balances these competing factors. Some data anonymization techniques might be limited to being applicable to only certain types of data. For example, data masking techniques are only applicable to categorical types of data (i.e., non-numeric data such as string, text, Boolean, and other non-numeric data). Additionally, known synthetic data generation techniques cannot ensure an underlying data structure of an original dataset is maximally preserved in the generated synthetic data. As such, the key influencers (i.e., data drivers contributing the most to the data values) in the original data are different than the those of the generated synthetic data. Such synthetically generated data, although anonymized, is not useful for predictive analytics where the key influencers can be regarded as the factors that impact target values. Synthetically generated data might also ignore rare events in the original data. As a result, synthetically generated data might not accurately reflect the original dataset, thereby reducing its effectiveness to replace or otherwise represent the original dataset in any meaningful way, including, for example, for data mining projects (e.g., the development, implementation, and testing), data visualizations related to the owner of the original dataset, predictive analytics, etc.

BRIEF DESCRIPTION OF THE DRAWINGS

FIG. 5 is an illustrative table representation of data, including the specification of a target column, according to some embodiments;

FIG. 9 is an illustrative process for data anonymization, according to some embodiments;

DETAILED DESCRIPTION

The following description is provided to enable any person in the art to make and use the described embodiments and sets forth the best mode contemplated for carrying out the described embodiments. Various modifications, however, will remain apparent to those in the art.

In some regards, data may be generally categorized into artificial data and real data (i.e., historical customer data). Although artificial data might be easily produced, there is no guarantee that such data accurately correlates to a dataset of real (e.g., customer) data, including the data features/structures and behaviors of (i.e., inter-relationships amongst) the real data. Providers and developers of cloud services (e.g., storage, servers, databases, and intelligence, analytics, etc.) and applications to implement those services oftentimes require data to develop, test, implement, validate, and demonstrate the cloud services. In many instances, cloud service providers and developers have a preferred desire to use actual, real-world data relating to customers to ensure that the services and applications they provide and support are tailored solutions for their customers.

Figure 1:
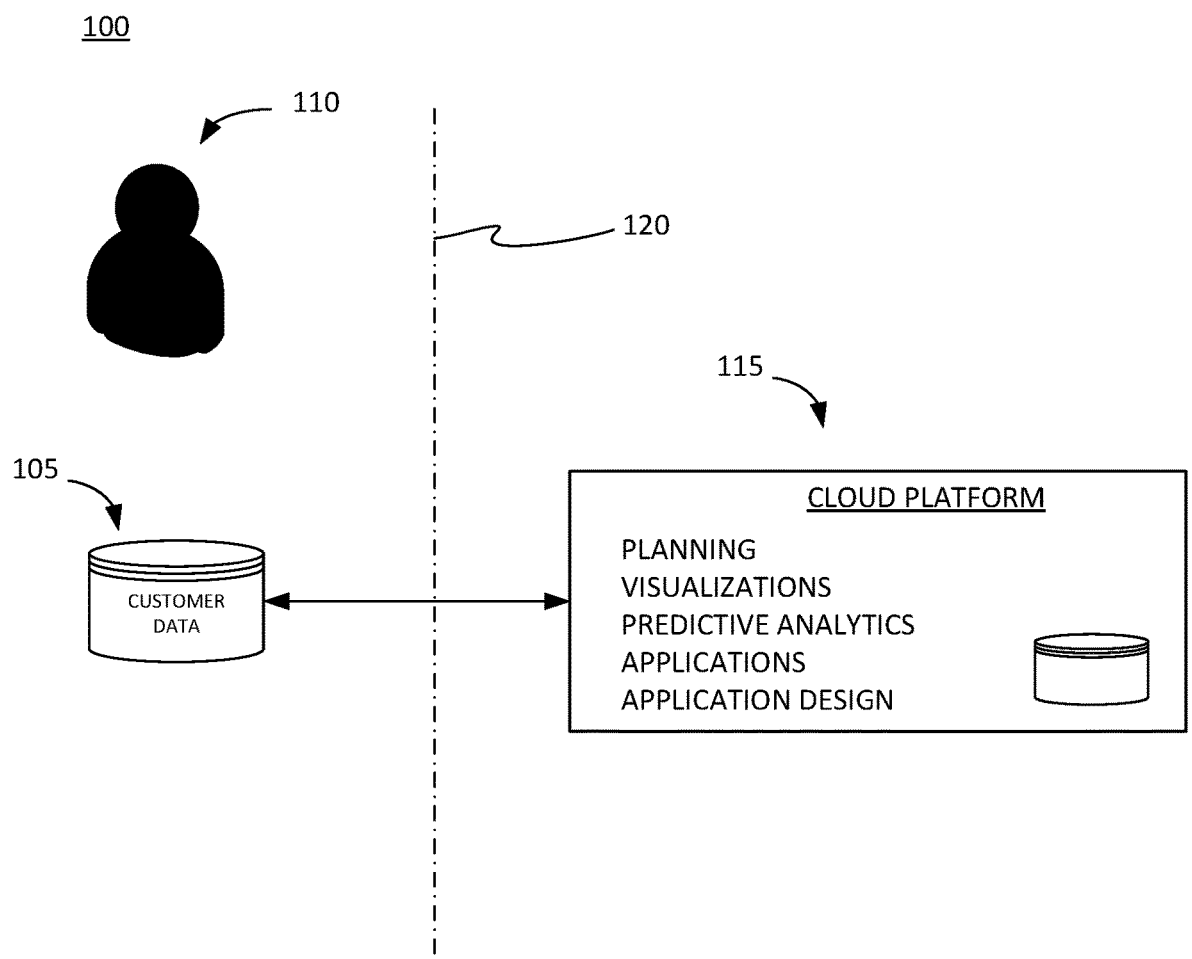
FIG. 1 is a block diagram of some illustrative aspects of a cloud platform according to some embodiments.

In some aspects, data security in a cloud environment is vitally important to protect and safeguard sensitive and private information of real customer data. FIG. 1 is a block diagram 100 illustratively depicting some aspects of a cloud environment and customer data related thereto. Data 105 belongs to customer 110 (e.g., an enterprise) and may include running data related to the customer's business (e.g., healthcare, retail, digital media, financial services, etc.) operations, wherein storage of the data may be on-premises or otherwise controlled by the customer. Cloud platform 115 may support cloud applications and services such as, for example, business intelligence, planning, predictive analytics, application design, etc. Storing and/or using the customer data on cloud platform 115 might potentially expose the data to one or more types of data security risks, notwithstanding firewall 120 and other data security protections (not shown in FIG. 1). Accordingly, in some embodiments data anonymization in a cloud environment may provide technical improvements and benefits related to data security and data usability for the cloud services and applications supported and provided by cloud platform 115.

Figures 2, 3:
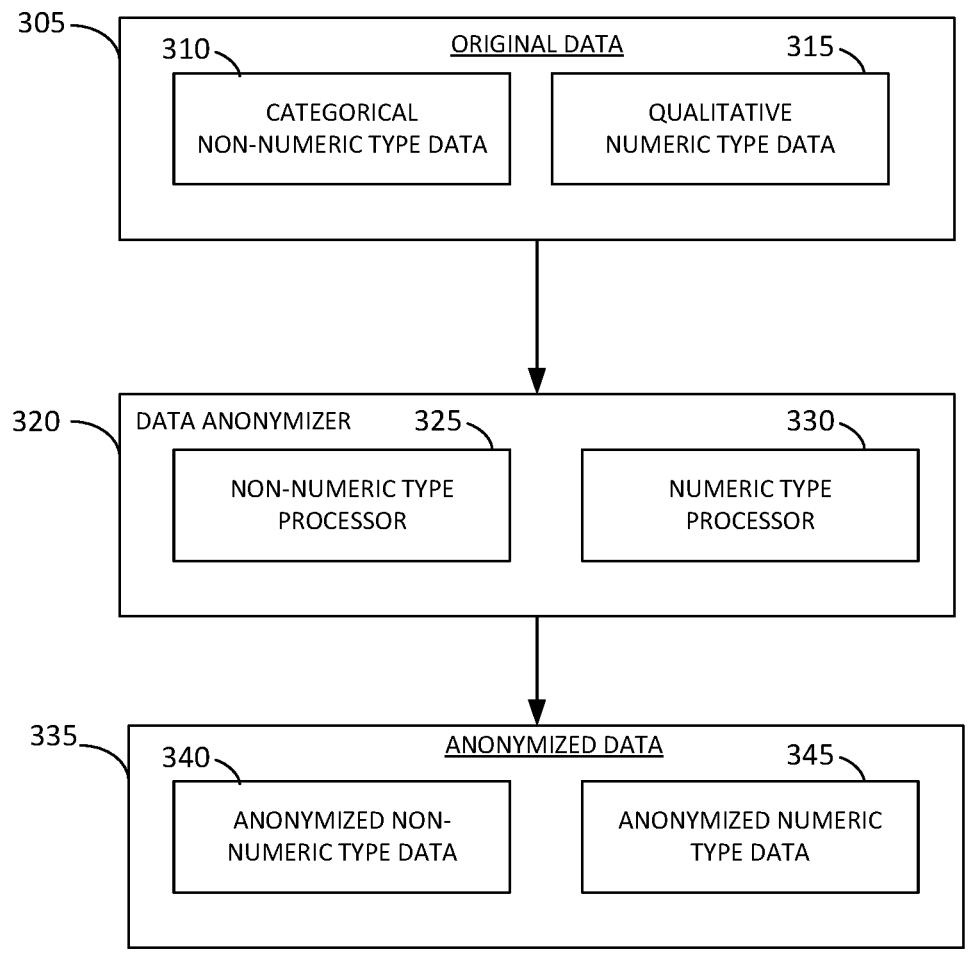
FIG. 2 is an illustrative table representation of data according to some embodiments.
FIG. 3 is an illustrative block diagram illustrating an overview of an anonymization of data, according to some embodiments.

Some embodiments provide a framework to provide data anonymization of full datasets, where a dataset might include both personally identifiable information, typically represented by categorical or qualitative values, and numerical data that is represented as quantitative, numeric values. FIG. 2 is an illustrative table representation of data, according to some embodiments. The data might include customer data corresponding to one or more database tables that may be used in a cloud environment by one or more cloud applications and services supported by a cloud platform infrastructure. As shown, table 200 is representative of a dataset (e.g. a collection of database tables) in some embodiments, where each column of the table represents a particular variable and each row corresponds to a specific record of the dataset. In the example of FIG. 2, columns are shown at 205, 210, 215, 220, and 225, while individual records are shown at rows 230, 235, and 240. Table 200 may include data values that are either a categorical, non-numeric type (e.g., string, character, Boolean) or a quantitative, numeric type (e.g., an integer, decimal, etc.) The columns in table 200 include either numeric values and are identified as being numeric columns, designated with the label "N" (e.g., columns 205, 210, and 225) or include non-numeric values and are referred to as non-numeric columns designated with the label "NN" (e.g., columns 210 and 215). The labels "N" and "NN" are shown in FIG. 2 for purposes of the discussion herein and do not necessarily indicate any actual value stored in table 200. As an example, non-numeric columns in table 200 may include a column for a customer name, country location, address, and other information and the numeric columns therein might include a column for revenue spent on a first product, revenue spent on a second product, and total revenue spent in a particular time period, where corresponding non-numeric values and numeric values populate each column for each record.

According to some embodiments, anonymization of an original dataset maximally preserves the underlying data structure(s) of the original data and the underlying relationships between the input variables and a target value of the original data in the generated anonymized data. In some aspects, by preserving the underlying data structure(s) and the underlying relationships between the input variables and a target value of the original data, data anonymized by some embodiments herein may be reliably used in predictive analytics wherein predicted values using the generated anonymized data will accurately correlate to the behaviors of the original dataset.

FIG. 3 includes a block diagram 300 illustrating an overview of a data anonymization process, according to some embodiments. Original data 305 includes both categorical, non-numeric type data 310 and qualitative, numeric type data 315. The original data is submitted to data anonymizer 320 that receives the original data as an input and generates an output of anonymized data 335, including both anonymized non-numeric data 340 and anonymized numeric data 345. Data anonymizer 320 includes a non-numeric type feature processor 325 to anonymize all of the non-numeric columns of the original data with non-numeric values. In some embodiments, the anonymization of the non-numeric values might be accomplished using data masking techniques where a dictionary is established to map each possible non-numeric value in the original data to a simulated values in the anonymized data. In some embodiments, other techniques may be used to anonymize the non-numerical values in the non-numeric columns of the original dataset.

Data anonymizer 320 includes a numeric type feature processor 330 to anonymize the numeric columns of the original data having numeric values. In some embodiments, numeric type feature processor 330 is configured to preserve the underlying data structure(s) and the underlying relationships between the input variables and a target value of the original data. The output of the numeric type feature processor 330 is the anonymized numeric type data 345 that is further combined with the anonymized non-numeric type data 340 generated by the non-numeric type feature processor 325 to produce a final set of anonymized data 335 that can be used by one or more services and applications instead of the original data 305.

Figure 4:
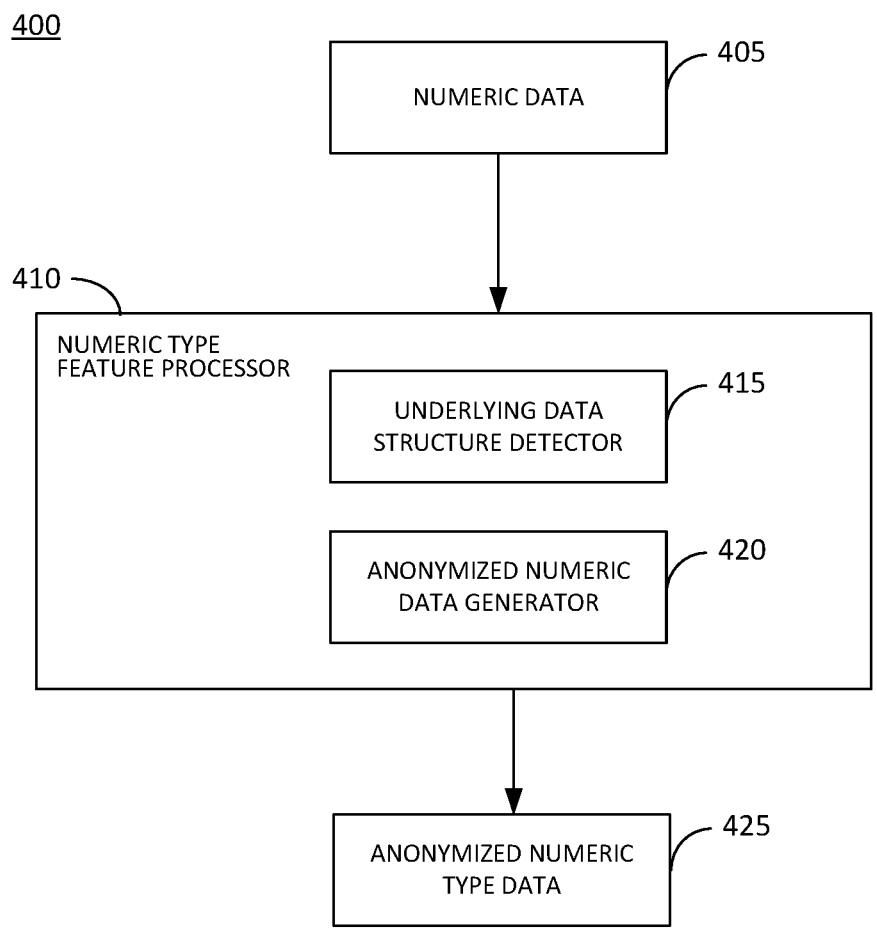
FIG. 4 is a block diagram illustrating an overview of an anonymization of numeric data, according to some embodiments.

FIG. 4 is a block diagram illustrating an overview 400 of a numeric type feature processor 410 configured to preserve the underlying data structure(s) and the underlying relationships between the input variables and a target value of the numeric type data of the original data 405, according to some embodiments. In some embodiments, numeric type feature processor 410 depicts details related to numeric type feature processor 330 introduced in FIG. 3, though not limited thereto. As shown in FIG. 4, numeric type feature processor 410 receives numeric type data 405 and includes an underlying data structure detector 415 and an anonymized numeric data generator 420. Numeric data 405 including the numeric type columns of data 405 (or at least a subset thereof) are provided to the numeric type feature processor 410 with one of the numeric columns being specified as a target column.

The underlying data structure detector 415 operates to detect, identify, or otherwise determine (1) the underlying structure of the data in the non-target columns of the numeric data, and (2) the underlying relationship between the non-target columns and the specified target column of the numeric data. This information determined and extracted from the numeric data by underlying data structure detector 415 is provided to and used by anonymized data generator 420 to generate an output including a new set of anonymized numeric type data 425 having a similar data structure and underlying relationship to the specified target column of the original numeric data 405.

FIG. 5 is an illustrative table representation of data included in a table 500, according to some embodiments. In the example of FIG. 5, columns shown at 505, 510, 515, and 520 are non-numeric columns ("NN") including non-numeric values for the records 545, 550, 555, and 560, whereas columns 525, 530, 535, and 540 are numeric columns ("N") including numeric values for the depicted records. As an example regarding the numeric data including the numeric columns of table 500, numeric column 525 may be specified as the target column, leaving columns 530, 535, and 540 as the non-target columns for this example set of numeric data. In the example of FIG. 5, target column 525 might include numeric values for "total sales" in a designated currency and the non-target columns might each include values for sales, in the designated currency, for particular products (e.g., 530 "Product_A", 535 "Product_B", and 540 "Product_C"). Here, the labels "N" and "NN" shown in FIG. 5 are provided for purposes of the discussion herein and do not necessarily indicate any actual stored value in table 500.

Figure 6:
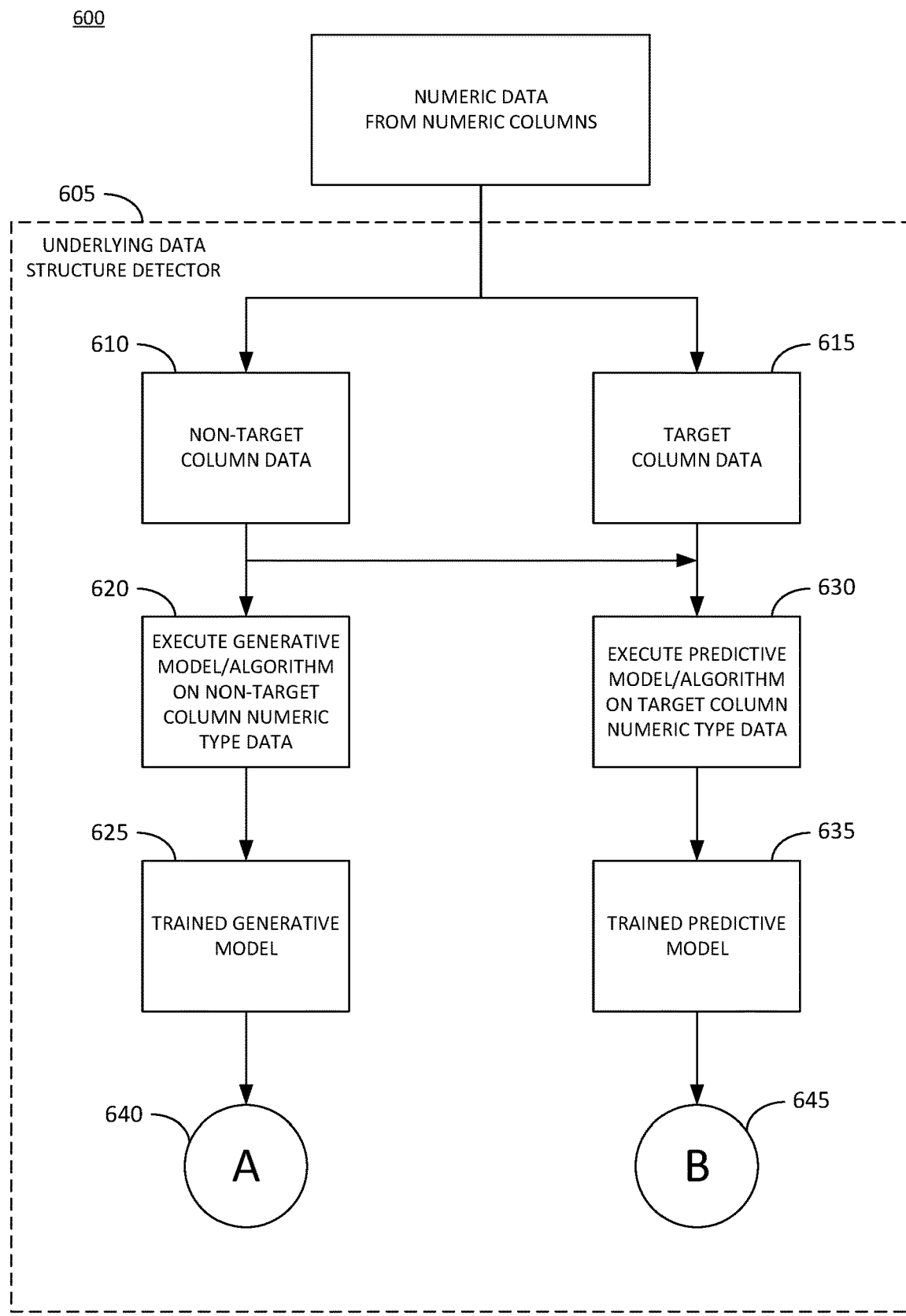
FIG. 6 is a flow diagram illustrating some aspects of numeric data anonymization, including an underlying data structure detector, according to some embodiments.

FIG. 6 is an illustrative flow diagram 600 for an operational flow of an underlying data structure detector for some aspects of numeric data anonymization, according to some embodiments. Process 600 and the other processes described herein may be performed using any suitable combination of hardware and software. Software program code embodying processes herein may be stored by any non-transitory tangible medium and further executed by any one or more computer processing units (e.g., a microprocessor, a microprocessor core, a microprocessor thread, etc.). FIG. 6, like other flow diagrams described herein, does not imply a fixed order to the operations, and embodiments of the present disclosure may be practiced in any order that is practicable.

As an overview, underlying data structure detector 605 is configured to accomplish two tasks. One task is to train a generative model, using numeric data of non-target columns of an original dataset, to capture the underlying data structure of the numeric data of non-target columns for the numeric data provided to the underlying data structure detector. The other task is to train a predictive model using numeric data of non-target columns as input variables and numeric data of the specified target column of the numeric data as a target variable, to capture the underlying relationship between the input variables (i.e., the non-target columns) and the target variable (i.e., the target column).

Specific operations of FIG. 6 include receiving the numeric data by the underlying data structure detector 605, wherein the numeric data comprises numeric columns where one of the numeric columns is specified as being a target column and the other columns are (e.g., by default) categorized as non-target columns of the numeric data. The non-target columns may be extracted from the numeric data at 610 and the specified target column may be extracted from the numeric data at 615.

Regarding the task of capturing the underlying data structure of the numeric data of the non-target columns provided to the underlying data structure detector 605, the numeric data of the non-target columns is used by an execution of a generative model or algorithm at 620 to generate a trained generative model 625. The trained generative model 625 may accurately capture the underlying data structure of the numeric data of the non-target columns of the original numeric data. In some embodiments, the generative model might include a Gaussian mixture model (GMM) algorithm, where the output of the execution of the GMM is a probability model on the data of the non-target columns. In some embodiments, other generative models, algorithms, and techniques rather than a GMM might be used. The trained generative model is saved at 640.

Regarding the task of capturing the underlying relationship between the non-target columns and the target column of the numeric data, the extracted numeric data of the target columns and the extracted numeric data of the target column are used by an execution of a predictive model at 630 to generate a trained predictive model 635. In some embodiments, the predictive model might be implemented by a regression or classification model or algorithm, wherein the non-target columns are used as input variables to the model/algorithm and the target column is used as the target variable for the model/algorithm. In some embodiments, other types of predictive models, algorithms, and techniques might be used at 630. The output of the execution of the predictive model or algorithm may be a regression/classification model of algorithm including an identification of the key influencers for the target variable. The trained predictive model is saved at 645.

Figure 7:
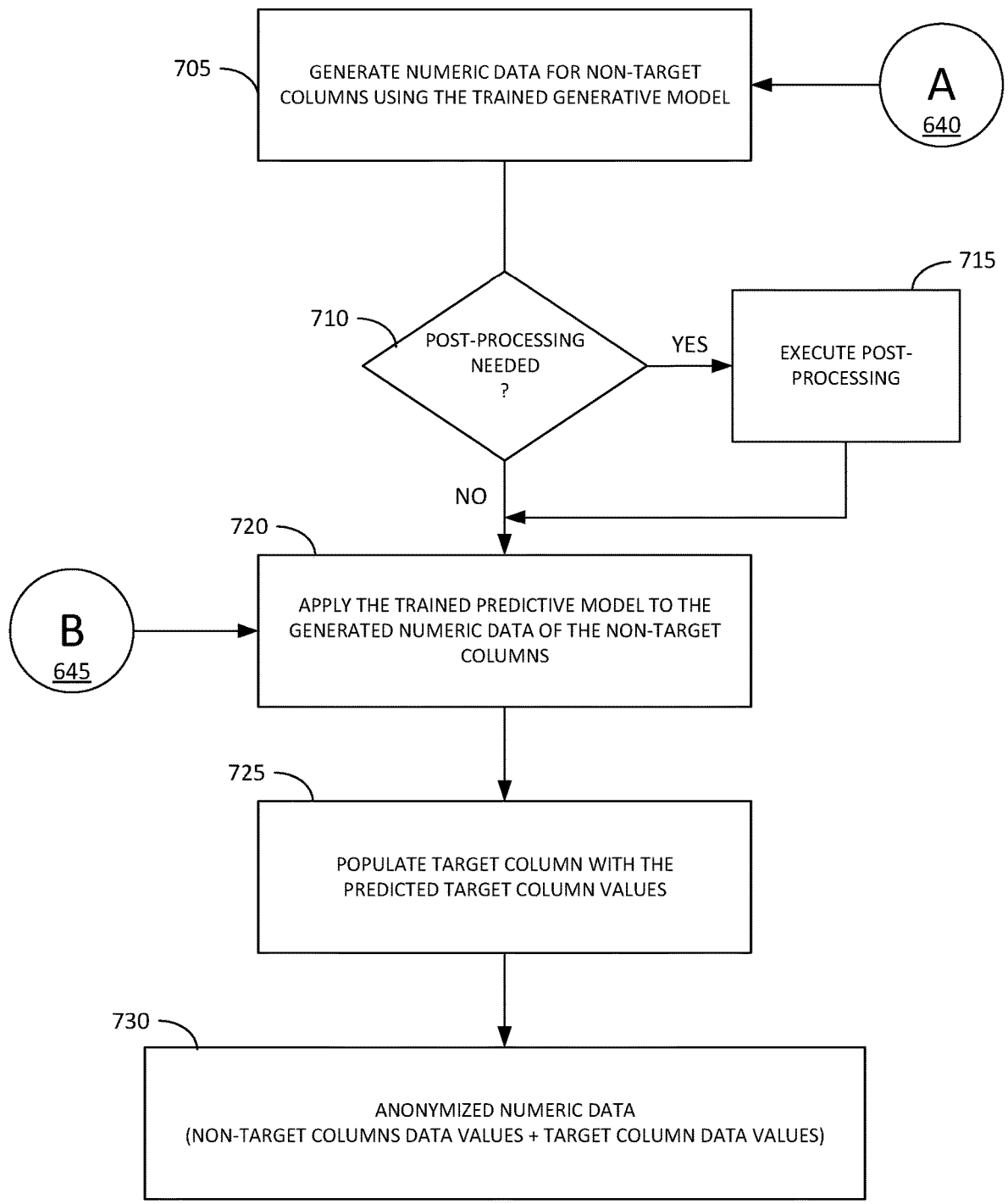
FIG. 7 is a flow diagram illustrating some aspects of numeric data anonymization, including a numeric data generator, according to some embodiments.

FIG. 7 is a flow diagram 700 illustrating some aspects of a numeric data anonymization framework, including an operational flow for a numeric data generator, according to some embodiments. In some aspects, FIG. 7 is a detailed depiction of the anonymized numeric data generator 420 introduced in FIG. 4, though not limited thereto. As shown in FIG. 4, the numeric data generator 420 receives the output of the underlying data structure detector 415. In some aspects, the flow diagram of FIG. 7 might be a continuation of the flow diagram of FIG. 6, where the outputs of the underlying data structure detector 605 of FIG. 6 (i.e., the trained generative model 640 and the trained predictive model 645) are used in process flow 700.

Referring to FIG. 7, the trained generative model 640 is used to generate a new set of numeric data for the non-target columns at 705, where the new set of numeric data values should have the same probability distribution as the original data. The probability distribution of the generated new set of non-target columns numeric data values can be checked at operation 710. If it is determined at 710 that the probability distribution of values in the newly generated set of numeric data strongly correlates with the original data, then process flow 700 proceeds to operation 720. In the event it is determined at 710 that the probability distribution of the values in some columns in the newly generated set of numeric data does not strongly correlate with the original data, then process flow 700 proceeds to operation 715 where a post-processing process is invoked for those non-target columns that do not have the same probability distribution as the original data in order to generate a second new set of non-target columns numeric data that does have the same probability distribution as the original numeric data.

At 720, the newly generated set of numeric data for the non-target columns is used as inputs to the trained predictive model 645 to generate predicted target values for the specified target column. The generated, predicted target values are used to populate the target column at 725. Continuing to 730, the generated set of new numeric data for the non-target columns and the target column including the predicted target values are combined to produce a set of anonymized numeric data that includes anonymized numeric values for the non-target columns and the target column.

Figure 8:
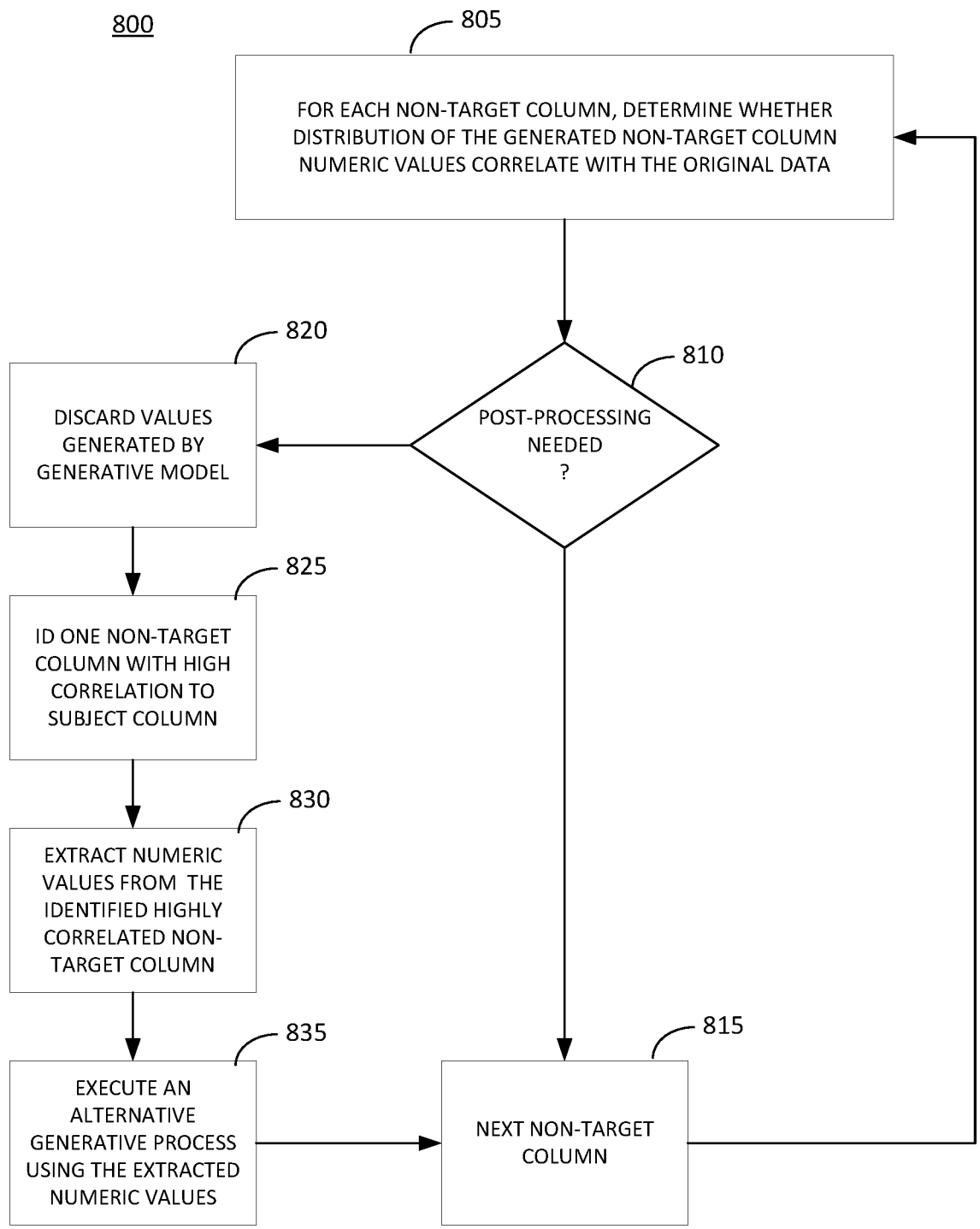
FIG. 8 is a flow diagram illustrating some aspects of numeric data anonymization, including a post-processing process for generated numeric data, according to some embodiments.

FIG. 8 is a flow diagram illustrating some aspects of numeric data anonymization, including a post-processing process for generated numeric data, according to some embodiments. In some aspects, FIG. 8 is a detailed depiction of the post-processing operation 715 introduced in FIG. 7, though not limited thereto. At operation 805, a determination is made for each non-target column of the generated new set of numeric data, on a column-by-column basis, whether the non-target column numeric data values generated by the generative model has a same probability distribution as the original data. In some embodiments, the distribution of the original numeric data might be determined or saved in a look-up table or other data structure for reference at operation 805. If the distribution of a particular (i.e., respective) non-target column of the generated new set of numeric data has the same probability distribution as the original data (i.e., it "fits" the original data) at 810, then process flow 800 proceeds to operation 815 where a next non-target column in the new set of generated non-target column numeric data is considered. If the distribution of the particular non-target column of the generated new set of non-target column numeric data values does not have a same probability distribution as the original data at 810, then process flow 800 proceeds to operation 820 where the current numeric data for the subject (i.e., respective) non-target column is discarded. At operation 825, one(1) non-target column in the original numeric data is identified that is most correlated to the non-target column being considered. The numeric values for the identified non-target column are extracted at operation 830 and used, at operation 835, to generate (2nd) new numeric values for the subject non-target column being considered using an alternative generative method. That is, the generative method at 835 is different than the generative process implemented by the trained generative model (e.g., 640). In some embodiments, the alternative generative process includes a Cholesky Decomposition algorithm or model to generate the new numeric values for the non-target column, although other processes and techniques might be used in some embodiments. In some regards, the alternative generative process including, but not limited to the Cholesky Decomposition type of algorithm, is used as an alternative process since the Cholesky Decomposition type of algorithm is applicable to only one column at a time as compared to the primary generative process disclosed for some embodiments herein.

The new numeric values for the subject non-target column generated at 835 are used for the subject (i.e., current, respective) non-target column and process 800 proceeds to a next column at 815. Process 800 can be performed for all of the non-target columns, as needed, in some embodiments.

In some aspects of an applications, some embodiments of the disclosed data anonymization framework and processes may be applied to a dataset or at least a portion thereof. For example, an original dataset may comprise 2500 records with 30 columns. Of those 30 columns, 5 non-numeric type columns include sensitive data and 8 numeric type columns contain sensitive data. In this example, the data of the 5 non-numeric type columns and the 8 numeric type columns may be anonymized, in accordance with some embodiments and the other columns might not be anonymized.

FIG. 9 is a flow diagram of a process that might be executed by a computer process and other elements herein to effectuate data anonymization, in accordance with some embodiments. Operation 905 includes receiving numeric data of an original (e.g., first) dataset, where the numeric data includes a plurality of columns of the original dataset having numeric values and one of the plurality of numeric columns is specified as being a target column. In some aspects, the numeric data might be extracted or otherwise identified from the original dataset.

Operation 910 includes training a generative model. The generative model might include the execution of a machine learning model. The generative model is trained based on numeric values in non-target columns of the plurality of columns of the original data to generate the trained generative model. In some aspects, the generative model operates to preserve the underlying data structure of the numeric type data of the original data. The trained generative model may be saved to a memory.

At 915, a predictive model is trained based on using the numeric values in the non-target columns of the plurality of columns of the original dataset as input variables and using the numeric type column specified as the target column as a target variable to generate a trained version of the predictive model. In some instances, the predictive model might be implemented by the execution of a machine learning model. The trained predictive model may be saved to a memory for a subsequent use.

At 920, a new set of numeric data is generated, by the saved trained generative model, for the non-target columns. The newly generated set of numeric data for the non-target columns generated at operation 920 should correlate to the underlying data structure of the numeric type data of the original data. In some embodiments, a post-processing method (not shown in FIG. 9, but shown in varying aspects in FIGS. 7 and 8) might be employed to determine, on a column-by-column basis, whether the new set of numeric data generated for the non-target columns actually correlates with the original dataset.

Operation 925 includes generating, by the previously saved trained predictive model using the new set of generated numeric data for the non-target columns as an input to the trained predictive model, predicted target values for the target column corresponding to the input of the new set of numeric data for the non-target columns. The numeric data generated by the predictive model (i.e., the predicted target values for the target column) should reflect the relationship between the input variables (i.e., the non-target columns) and output variable (i.e., the target column).

Process 900 concludes at operation 930 with the combining of the new set of numeric data for the non-target columns and the target column including the generated predicted target values in order to generate anonymized numeric data for the original dataset that can be used to replace the numeric data in the original dataset.

Thus, embodiments may provide a data anonymization framework that incorporates consideration of the following factors: (1) whether the probability distribution of the original data in numeric type non-target columns is preserved in the generated data such that the generated anonymized dataset has a similar underlying data structure as the original dataset; (2) whether there is a similar correlation between the numeric type non-target columns in the original dataset and the generated anonymized data; (3) whether the distribution of the predicted target values in the anonymized data are similar to the distribution of target values in original data; and (4) whether the key influencers and their contributions, as identified through the predictive model(s) based on the original data and the anonymized data, are similar for the original data and the anonymized data. Moreover, some embodiments, as discussed in detail herein, include mechanisms to implement the foregoing considerations to ensure that the data anonymization framework receiving an input of an original dataset generates an outputs of anonymized data wherein (1) the anonymized data preserves the underlying data structure of the original dataset; (2) there is a similar correlation between the numeric type non-target columns in the original dataset and the generated anonymized data; (3) the distribution of the predicted target values in the anonymized data are similar to the distribution of target values in original data; and (4) the key influencers and their contributions are similar for the original data and the anonymized data.

In some instances, implementations of certain aspects of the data anonymization framework disclosed herein have been validated and confirmed, for example, that the original data and the generated anonymized data are similar with each other (i.e., the correlation between the non- target columns is accurately recovered in the anonymized dataset, which is an indication that the underlying data structure of the non-target columns have been preserved accurately), that the distribution of the target values of the original data and the predicted target values of the anonymized data are similar with each other; and the underlying mapping from the non-target columns to the target column are preserved in the anonymized data.

Figure 10:
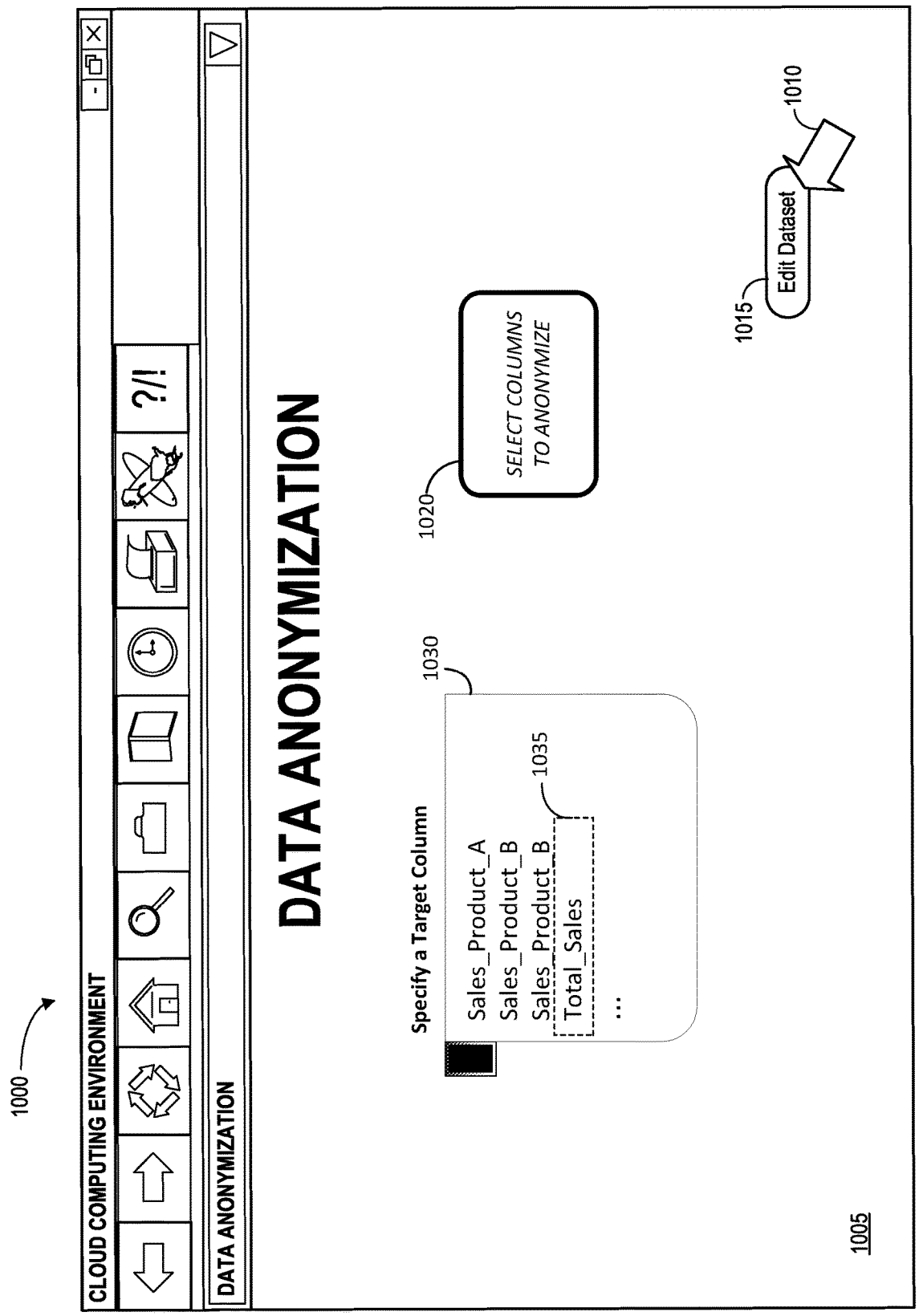
FIG. 10 is an illustrative depiction of an outward facing graphical user interface, according to some embodiments.

FIG. 10 is an illustrative diagram of a data anonymization display 1000 according to some embodiments. Display 1000 includes a graphical representation of an outward facing user interface (UI) 1005 related to a data anonymization service associated with a cloud computing environment. UI 1005 may be displayed within a display device associated with a data anonymization service or a display device independent of the data anonymization service (e.g., a display of a computing device or system in communication with the data anonymization over a network via a browser application). Selection of one or more UI elements (e.g., icons, buttons, drop-down menu options, etc.) by a touchscreen input, computer pointer 1010, etc. may result in the display of a popup window containing more detailed information about that element and/or various options (e.g., to specify a target column, select columns to anonymize, etc.). Selection of an "Edit Dataset" icon 1015 may enable an operator or administrator to indicate or change a specified target column within drop-down menu 1030 (e.g., the selection of "Total_Sales" 1035) and select specific columns to anonymize (e.g., numeric columns and non-numeric columns) by initially selecting UI button 1020 to cause the display of a drop-down menu including the listing of columns in the dataset to be anonymized (not shown in FIG. 10).

Figure 11:
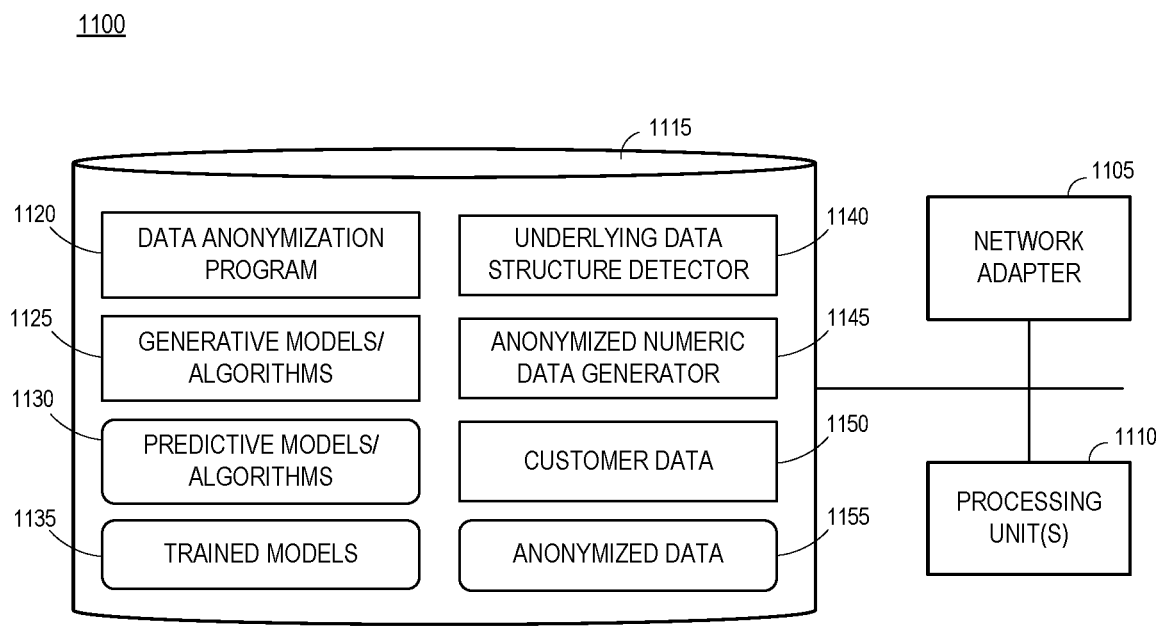
FIG. 11 is a block diagram of a system to generate anonymized data, according to some embodiments.

FIG. 11 is an illustrative block diagram of a computing system 1100, according to some embodiments. System 1100 may comprise a computing system to facilitate the anonymization of data (e.g., customer data) in a cloud environment. In some embodiments, computing system 1100 may include a standalone system, and one or more elements of computing system 1100 may be located in the cloud.

System 1100 includes network adapter 1105 to communicate with external devices via a network connection. Processing unit(s) 1110 may comprise one or more processors, processor cores, or other processing units to execute processor-executable program code. Storage system 1115 may include one or more memory devices (e.g., a hard disk drive, a solid-state drive) and stores processor-executable program code of data anonymization program 1120 that may be executed to anonymize data, in accordance with one or more processes herein.

Data anonymization program 1120 may access and use underlying data structure detector 1140 that detects the underlying data structure and features of numeric type data customer data 1150, in accordance with some embodiments. As discussed in detail above (e.g., process 600 of FIG. 6), underlying data structure detector 1140 may further access and use generative models/algorithms 1125 and predictive models/algorithms 1130 to generate trained models that are stored at 1135. In some embodiments, the predictive models/algorithms 1130 might include predictive models that may be used to post-process generated data comprising non-target columns of numeric type data, as needed (e.g., on a column-by-column basis). Anonymized numeric data generator 1145 may be executed to anonymize data generated by an execution of the trained models 1135. With the anonymized data being stored at 1155 for further data analysis, data visualizations, data mining, predictive analytics, etc., the original customer data 1150 (which is now anonymized in accordance with aspects herein) may be discarded.

Computer programs herein (also referred to as programs, software, software applications, "apps", or code) may include machine instructions for a programmable processor and may be implemented in a high-level procedural and/or object-oriented programming language, and/or in assembly/machine language. As used herein, the terms "machine-readable medium" and "computer-readable medium" refer to any computer program product, apparatus, cloud storage, internet of things, and/or device (e.g., magnetic discs, optical disks, memory, programmable logic devices (PLDs)) used to provide machine instructions and/or data to a programmable processor, including a machine-readable medium that receives machine instructions as a machine-readable signal. The "machine-readable medium" and "computer-readable medium," however, do not include transitory signals. The term "machine-readable signal" refers to any signal that may be used to provide machine instructions and/or any other kind of data to a programmable processor.

The above descriptions and illustrations of processes herein should not be considered to imply a fixed order for performing the process steps. Rather, the process steps may be performed in any order that is practicable, including simultaneous performance of at least some steps. Although the disclosure has been described in connection with specific examples, it should be understood that various changes, substitutions, and alterations apparent to those skilled in the art can be made to the disclosed embodiments without departing from the spirit and scope of the disclosure as set forth in the appended claims.

What is claimed is:

1. A computer-implemented method, the method comprising:
    receiving numeric data of a first dataset, the numeric data being a plurality of columns of the first dataset having numeric values with one of the plurality of columns being specified by a user as a target column;
    training a generative model based on numeric values in non-target columns of the plurality of columns to generate a trained generative model;
    training a predictive model based on the numeric values in non-target columns of the plurality of columns being input variables and the target column being a target variable to generate a trained predictive model;
    generating, by the trained generative model, a new set of numeric data for the non-target columns;
    generating, by the trained predictive model using the new set of numeric data for the non- target columns as an input to the trained predictive model, predicted target values for the target column corresponding to the input of the new set of numeric data for the non-target columns; and
    generating anonymized numeric data for the first dataset by combining the new set of numeric data for the non-target columns and the target column including the generated predicted target values.

2. The method of claim 1, further comprising:
    receiving non-numeric data of the first dataset, the non-numeric data being one or more columns of the first dataset having non-numeric values;
    anonymizing the non-numeric data of the first dataset; and
    generating final anonymized data for the first dataset by combining the anonymized non- numeric data and the anonymized numeric data.

3. The method of claim 1, further comprising:
    determining, whether the generated new set of numeric data for each of the non-target columns correlates to the received numeric data of the first dataset; and
    generating for each non-target column, in an instance it is determined that the generated new set of numeric data for the respective non-target column does not correlate to the received numeric data of the first dataset, a second new set of numeric data for the respective non-target column that correlates to the received numeric data of the first dataset based on a numeric data generating process other than the trained generative model.

4. The method of claim 3, wherein the determination of whether the generated new set of numeric data for each of the non-target columns correlates to the received numeric data of the first dataset is based on whether a distribution of numeric values for each respective column of the non-target columns in the generated new set of numeric data correlates to the received numeric data of the first dataset.

5. The method of claim 3, wherein the second new set of numeric data for each non-target column is generated by:
   discarding the numeric values for the respective column in the new set of numeric data;
   identifying, in the plurality of columns of the first dataset, one non-target column with a high correlation to the respective column; and
   applying a Cholesky decomposition algorithm to numeric values in the one identified non-target column to generate the second new data values for the respective column.

6. The method of claim 1, further comprising extracting the numeric values in the non-target columns from the received numeric data of the first dataset and extracting the numeric values in the target column from the received numeric data of the first dataset.

7. The method of claim 1, wherein the new set of numeric data for the non-target columns preserves an underlying data structure of the non-target columns of the first dataset and the target column populated with the generated predicted target values preserves an underlying relationship between the non-target columns of the first dataset and the specified target column of the first dataset.

8. A system, the system comprising:
   a computer processor, and
   computer memory, coupled to the computer processor, storing instructions that, when executed by the computer processor cause the computer processor to:
      receive numeric data of a first dataset, the numeric data being a plurality of columns of the first dataset having numeric values with one of the plurality of columns being specified by a user as a target column;
      train a generative model based on numeric values in non-target columns of the plurality of columns to generate a trained generative model;
      train a predictive model based on the numeric values in non-target columns of the plurality of columns being input variables and the target column being a target variable to generate a trained predictive model;
      generate, by the trained generative model, a new set of numeric data for the non- target columns;
      generate, by the trained predictive model using the new set of numeric data for the non-target columns as an input to the trained predictive model, predicted target values for the target column corresponding to the input of the new set of numeric data for the non-target columns; and
      generate anonymized numeric data for the first dataset by combining the new set of numeric data for the non-target columns and the target column including the generated predicted target values.

9. The system of claim 8, wherein the computer processor further executes instructions to cause the computer processor to:
   receive non-numeric data of the first dataset, the non-numeric data being one or more columns of the first dataset having non-numeric values;
   anonymize the non-numeric data of the first dataset; and
   generate final anonymized data for the first dataset by combining the anonymized non- numeric data and the anonymized numeric data.

10. The system of claim 8, wherein the computer processor further executes instructions to cause the computer processor to:
   determine, whether the generated new set of numeric data for each of the non-target columns correlates to the received numeric data of the first dataset; and
   generate for each non-target column, in an instance it is determined that the generated new set of numeric data for the respective non-target column does not correlate to the received numeric data of the first dataset, a second new set of numeric data for the respective non-target column that correlates to the received numeric data of the first dataset based on a numeric data generating process other than the trained generative model.

11. The system of claim 10, wherein the determination of whether the generated new set of numeric data for each of the non-target columns correlates to the received numeric data of the first dataset is based on whether a distribution of numeric values for each respective column of the non-target columns in the generated new set of numeric data correlates to the received numeric data of the first dataset.

12. The system of claim 10, wherein the second new set of numeric data for each non-target column is generated by:
   discarding the numeric values for the respective column in the new set of numeric data;
   identifying, in the plurality of columns of the first dataset, one non-target column with a high correlation to the respective column; and
   applying a Cholesky decomposition algorithm to numeric values in the one identified non-target column to generate the second new data values for the respective column.

13. The system of claim 8, wherein the computer processor further executes instructions to cause the computer processor to extract the numeric values in the non- target columns from the received numeric data of the first dataset and extracting the numeric values in the target column from the received numeric data of the first dataset.

14. The system of claim 8, wherein the new set of numeric data for the non-target columns preserves an underlying data structure of the non-target columns of the first dataset and the target column populated with the generated predicted target values preserves an underlying relationship between the non-target columns of the first dataset and the specified target column of the first dataset.

15. A non-transitory, computer readable medium having executable instructions stored therein that, when executed by a computer processor cause the processor to perform a method, the method comprising:
   receiving numeric data of a first dataset, the numeric data being a plurality of columns of the first dataset having numeric values with one of the plurality of columns being specified by a user as a target column;
   training a generative model based on numeric values in non-target columns of the plurality of columns to generate a trained generative model;
   training a predictive model based on the numeric values in non-target columns of the plurality of columns being input variables and the target column being a target variable to generate a trained predictive model;
   generating, by the trained generative model, a new set of numeric data for the non-target columns;
   generating, by the trained predictive model using the new set of numeric data for the non- target columns as an input to the trained predictive model, predicted target values for the target column corresponding to the input of the new set of numeric data for the non-target columns; and generating anonymized numeric data for the first dataset by combining the new set of numeric data for the non-target columns and the target column including the generated predicted target values.

16. The medium of claim 15, further comprising:
receiving non-numeric data of the first dataset, the non-numeric data being one or more columns of the first dataset having non-numeric values;
anonymizing the non-numeric data of the first dataset; and
generating final anonymized data for the first dataset by combining the anonymized non- numeric data and the anonymized numeric data.

17. The medium of claim 15, further comprising:
determining, whether the generated new set of numeric data for each of the non-target columns correlates to the received numeric data of the first dataset; and
generating for each non-target column, in an instance it is determined that the generated new set of numeric data for the respective non-target column does not correlate to the received numeric data of the first dataset, a second new set of numeric data for the respective non-target column that correlates to the received numeric data of the first dataset based on a numeric data generating process other than the trained generative model.

18. The medium of claim 17, wherein the determination of whether the generated new set of numeric data for each of the non-target columns correlates to the received numeric data of the first dataset is based on whether a distribution of numeric values for each respective column of the non-target columns in the generated new set of numeric data correlates to the received numeric data of the first dataset.

19. The medium of claim 17, wherein the second new set of numeric data for each non-target column is generated by:
discarding the numeric values for the respective column in the new set of numeric data;
identifying, in the plurality of columns of the first dataset, one non-target column with a high correlation to the respective column; and
applying a Cholesky decomposition algorithm to numeric values in the one identified non-target column to generate the second new data values for the respective column.

20. The medium of claim 15, wherein the new set of numeric data for the non-target columns preserves an underlying data structure of the non-target columns of the first dataset and the target column populated with the generated predicted target values preserves an underlying relationship between the non-target columns of the first dataset and the specified target column of the first dataset.

* * * * *